United States Patent
Das et al.

(10) Patent No.: US 12,437,554 B2
(45) Date of Patent: Oct. 7, 2025

(54) DETECTING AT LEAST ONE EMERGENCY VEHICLE USING A PERCEPTION ALGORITHM

(71) Applicant: Connaught Electronics Ltd., Tuam (IE)

(72) Inventors: Arindam Das, Mumbai (IN); Sudarshan Paul, Mumbai (IN); Sanjoy Das, Mumbai (IN); Deep Doshi, Troy, MI (US)

(73) Assignee: Connaught Electronics Ltd., Tuam (IE)

( * ) Notice: Subject to any disclaimer, the term of this patent is extended or adjusted under 35 U.S.C. 154(b) by 433 days.

(21) Appl. No.: 18/170,642

(22) Filed: Feb. 17, 2023

(65) Prior Publication Data

US 2024/0282116 A1   Aug. 22, 2024

(51) Int. Cl.
*G06V 20/58* (2022.01)
*G06N 3/0464* (2023.01)

(52) U.S. Cl.
CPC ........... *G06V 20/58* (2022.01); *G06N 3/0464* (2023.01); *B60W 2420/403* (2013.01); *B60W 2420/54* (2013.01); *B60W 2422/95* (2013.01)

(58) Field of Classification Search
CPC .............................. G06V 20/58; B60W 2422/95
See application file for complete search history.

(56) References Cited

U.S. PATENT DOCUMENTS

| | | | |
|---|---|---|---|
| 11,610,599 B2 | 3/2023 | Grauman et al. | |
| 11,816,987 B2 | 11/2023 | Dantrey et al. | |
| 2018/0137756 A1 | 5/2018 | Moosaei et al. | |
| 2021/0034914 A1 | 2/2021 | Bansal | |
| 2021/0103747 A1 | 4/2021 | Moustafa et al. | |

(Continued)

FOREIGN PATENT DOCUMENTS

| | | |
|---|---|---|
| EP | 3965066 A2 | 3/2022 |
| EP | 3971770 A2 | 3/2022 |

OTHER PUBLICATIONS

European Patent Office, International Search Report (with English translation) and Written Opinion of corresponding International Application No. PCT/US2024/014598, dated Jun. 10, 2024.

(Continued)

*Primary Examiner* — Benjamin O Dulaney
(74) *Attorney, Agent, or Firm* — Connaught Electronics Ltd.

(57) ABSTRACT

For training a perception algorithm to detect an emergency vehicle, respective audio datasets are received from two microphones and respective spectrograms are generated. At least one interaural difference map is generated based on the spectrograms, audio source localization data is generated, which specifies a number of audio sources in respective grid cells of a spatial grid, by applying a CRNN to first input data containing the spectrograms and the least one interaural difference map. An image is received from a camera and output data comprising a bounding box for the emergency vehicle is predicted by applying at least one further ANN to second input data containing the image and the spectrograms. Network parameters are adapted depending on the output data and the audio source localization data.

20 Claims, 5 Drawing Sheets

(56) References Cited

U.S. PATENT DOCUMENTS

2022/0048529 A1    2/2022  Ding
2022/0157165 A1*  5/2022  Dantrey ................. H04R 3/005
2022/0219736 A1*  7/2022  Xu ........................ B60W 10/20

OTHER PUBLICATIONS

Qian Rui et al.: "Multiple Sound Sources Localization from Coarse to Fine", (Nov. 12, 2020) Springer, pp. 292-308, XP047588728, Section 3.3.

* cited by examiner

70

Provide a convolutional recurrent neural network (CRNN) and at least one further artificial neural network (ANN) to detect at least one emergency vehicle.
71

Receive at least two time-dependent audio datasets from two microphones mounted at different positions on the vehicle.
72

Generate at least two spectrograms based on the at least two time-dependent audio datasets.
73

Generate at least one interaural difference map based on the at least two spectrograms, which contains at least one of an interaural phase difference map or an interaural time difference map or an interaural level difference map.
74

Generate audio source localization data for at least one grid cell of a predefined spatial grid in an environment of the vehicle.
75

Specify a number of audio sources in the at least one grid cell.
76

Apply the CRNN to a first input data containing the at least two spectrograms and the at least one interaural difference map.
77

Receive at least one camera image from at least one camera mounted to the vehicle.
78

Predict output data of at least one bounding box for the at least one emergency vehicle by applying the at least one further ANN to a second input data containing the at least one camera image and the at least two spectrograms
79

Adapt network parameters of the CRNN and the at least one further ANN by depending on the output data and the audio source localization data
80

Fig.7

DETECTING AT LEAST ONE EMERGENCY VEHICLE USING A PERCEPTION ALGORITHM

TECHNICAL FIELD

The present invention is directed to a computer-implemented method for training a perception algorithm of a vehicle, a perception system for a vehicle, and a non-transitory computer-readable storage medium storing instructions, which when executed on a computer, cause the computer to perform a method for training a perception algorithm of a vehicle.

BACKGROUND OF THE INVENTION

The invention relates to the field of in the context of driver assistance systems and other partially automatic or fully automatic driving tasks, the reliable automatic detection or tracking of emergency vehicles with activated flashing lights may be important for safety reasons and also for unblocking a path for the emergency vehicle.

SUMMARY OF THE INVENTION

It is an objective of the present invention to detect emergency vehicles with increased reliability, in particular for different lighting conditions.

A computer-implemented method for training a perception algorithm of a vehicle. The method includes providing a convolutional recurrent neural network (CRNN) and at least one further artificial neural network (ANN) to detect at least one emergency vehicle. The method further includes receiving at least two time-dependent audio datasets from two microphones mounted at different positions on the vehicle. The method additionally includes generating at least two spectrograms based on the at least two time-dependent audio datasets. The method moreover includes generating at least one interaural difference map based on the at least two spectrograms, which contains at least one of an interaural phase difference map or an interaural time difference map or an interaural level difference map. The method further includes generating audio source localization data for at least one grid cell of a predefined spatial grid in an environment of the vehicle. The method additionally includes specifying a number of audio sources in the at least one grid cell. The method moreover includes applying the CRNN to a first input data containing the at least two spectrograms and the at least one interaural difference map. The method further includes receiving at least one camera image from at least one camera mounted to the vehicle. The method additionally includes predicting output data of at least one bounding box for the at least one emergency vehicle by applying the at least one further ANN to a second input data containing the at least one camera image and the at least two spectrograms. The method moreover includes adapting network parameters of the CRNN and the at least one further ANN by depending on the output data and the audio source localization data.

A perception system for a vehicle. The perception system includes a data processing apparatus. The perception system further includes a memory device configured to store a perception algorithm. The perception system additionally includes a convolutional recurrent neural network (CRNN) and at least one further artificial neural network (ANN) configured to detect at least one emergency vehicle. The perception system moreover includes at least two microphones mounted at different positions on the vehicle configured to generate at least two time-dependent audio datasets. The perception system further includes at least one camera mounted to the vehicle configured to generate at least one camera image. The perception system additionally includes a computing unit configured to generate at least two spectrograms based on the at least two time-dependent audio datasets. The perception system moreover includes a computing unit configured to generate at least one interaural difference map based on the at least two spectrograms, which contains at least one of an interaural phase difference map or an interaural time difference map or an interaural level difference map. The perception system further includes a computing unit configured to generate audio source localization data for at least one grid cell of a predefined spatial grid in an environment of the vehicle. The perception system additionally includes a computing unit configured to specify a number of audio sources in the at least one grid cell. The perception system moreover includes a computing unit configured to apply the CRNN to a first input data containing the at least two spectrograms and the at least one interaural difference map. The perception system further includes a computing unit configured to predict output data of at least one bounding box for the at least one emergency vehicle by applying the at least one further ANN to a second input data containing the at least one camera image and the at least two spectrograms. The perception system additionally includes a computing unit configured to adapt network parameters of the CRNN and the at least one further ANN by depending on the output data and the audio source localization data.

A non-transitory computer-readable storage medium storing instructions, which when executed on a computer, cause the computer to perform a method for training a perception algorithm of a vehicle. The method includes providing a convolutional recurrent neural network (CRNN) and at least one further artificial neural network (ANN) to detect at least one emergency vehicle. The method further includes receiving at least two time-dependent audio datasets from two microphones mounted at different positions on the vehicle. The method additionally includes generating at least two spectrograms based on the at least two time-dependent audio datasets. The method moreover includes generating at least one interaural difference map based on the at least two spectrograms, which contains at least one of an interaural phase difference map or an interaural time difference map or an interaural level difference map. The method further includes generating audio source localization data for at least one grid cell of a predefined spatial grid in an environment of the vehicle. The method additionally includes specifying a number of audio sources in the at least one grid cell. The method moreover includes applying the CRNN to a first input data containing the at least two spectrograms and the at least one interaural difference map. The method further includes receiving at least one camera image from at least one camera mounted to the vehicle. The method additionally includes predicting output data of at least one bounding box for the at least one emergency vehicle by applying the at least one further ANN to a second input data containing the at least one camera image and the at least two spectrograms. The method moreover includes adapting network parameters of the CRNN and the at least one further ANN by depending on the output data and the audio source localization data.

The foregoing elements and features can be combined in various combinations without exclusivity, unless expressly indicated otherwise. These elements and features, as well as the operation thereof, will become more apparent in view of the following detailed description with accompanying drawings. It should be understood that the following detailed description and accompanying drawings are intended to be exemplary in nature and non-limiting.

BRIEF DESCRIPTION OF DRAWINGS

The embodiments of the present disclosure are pointed out with particularity in the appended claims. Various other features will become more apparent to those skilled in the art from the following detailed description of the disclosed non-limiting embodiments and will be best understood by referring to the following detailed description along with the accompanying drawings in which:

FIG. 7 illustrates an example of a flowchart diagram of a method for training a perception algorithm of a vehicle.

DETAILED DESCRIPTION OF THE INVENTION

Figure 1:
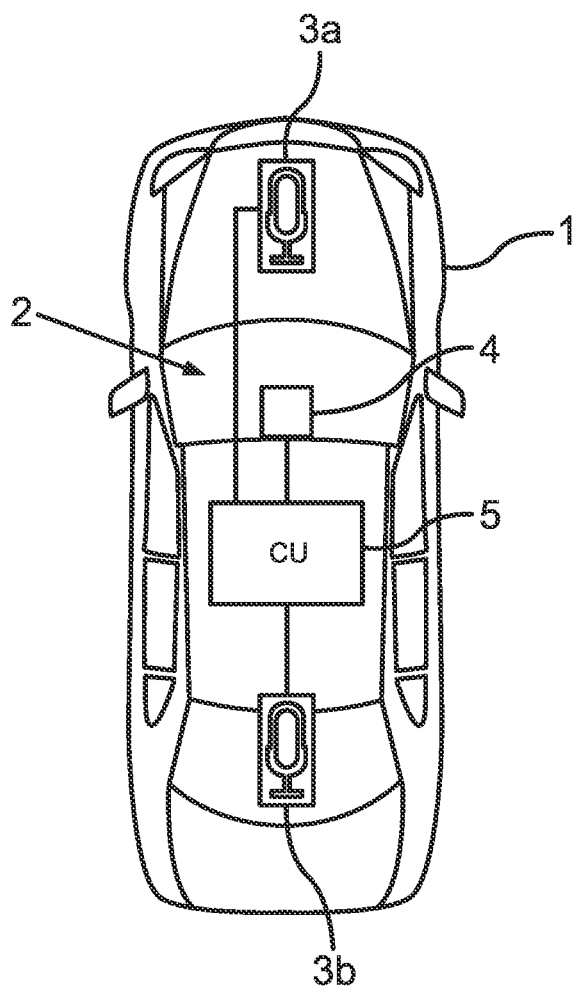
FIG. 1 illustrates schematically an exemplary implementation of a vehicle according to the invention.

Detailed embodiments of the present invention are disclosed herein. It is to be understood that the disclosed embodiments are merely examples of the invention that can be embodied in various and alternative forms. The Figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features described and illustrated with reference to any one of the Figures can be combined with features illustrated in one or more other Figures to produce embodiments that are not explicitly described or illustrated. The combinations of features illustrated provide representative embodiments for typical applications. However, various modifications and combinations of the features consistent with the teachings of this disclosure can be desired for particular applications or implementations.

The invention is based on a multi-modal, in particular bi-modal, approach making use of camera images as well as audio data for training a perception algorithm. To achieve an improved performance, in particular an increased detection reliability of the trained perception algorithm, audio sources are localized using a convolutional recurrent neural network, CRNN. At least one further artificial neural network, ANN, is applied to camera images and audio spectrograms. The localization of the audio sources by the CRNN is used to train the at least one further ANN.

According to an aspect of the invention, a computer-implemented method for training a perception algorithm to detect at least one emergency vehicle is provided. The perception algorithm contains a convolutional recurrent neural network CRNN and at least one further artificial neural network, ANN. Respective time-dependent audio datasets are received from two microphones, which are mounted at different position on a vehicle, and a respective spectrogram is generated based on each audio dataset. At least one interaural difference map, which contains an interaural phase difference map and/or an interaural time difference map and/or an interaural level difference map, is generated based on the spectrograms. Audio source localization data is generated, which, for each grid cell of a predefined spatial grid in an environment of the vehicle, specifies a number of audio sources in the respective grid cell, by applying the CRNN to first input data containing the spectrograms and the at least one interaural difference map.

At least one camera image is received from at least one camera mounted to the vehicle. Output data comprising at least one bounding box for the at least one emergency vehicle is predicted by applying the at least one further ANN to second input data containing the at least one camera image and the spectrograms. Network parameters of the CRNN and the at least one further ANN are adapted depending on the output data and depending on the audio source localization data.

Unless stated otherwise, all steps of the computer-implemented method for training the perception algorithm may be performed by a data processing apparatus, in particular of the vehicle, which comprises at least one computing unit. In particular, the at least one computing unit is configured or adapted to perform the steps of the computer-implemented method. For this purpose, the at least one computing unit may for example store a computer program comprising instructions which, when executed by the at least one computing unit, cause the at least one computing unit to execute the computer-implemented method.

For any implementation of the computer-implemented method for training the perception algorithm, corresponding implementations of a method, which is not purely computer-implemented, are obtained by including method steps of generating the at least one camera image by the at least one camera and/or generating the audio datasets by the microphones.

In particular, the at least one camera is mounted to the vehicle to capture an outer environment of the vehicle. Analogously, the microphones are mounted at the vehicle to detect sounds from the outer environment of the vehicle.

The perception algorithm can be understood as a computer algorithm for extracting information about the environment, here, in particular, information about the location of the at least one emergency vehicle in terms of the bounding boxes, from environmental sensor data, here, in particular, the at least one camera image and the audio datasets. In particular, the at least one further ANN comprises one or more object detection ANNs.

The audio source localization data may for example be understood as a vector or an array, wherein each entry of the vector or array is associated to exactly one grid cell of the grid. The value of an entry of the vector or array is the number of audio sources within the corresponding grid cell as predicted by the CRNN.

The audio datasets can be understood as the respective amplitude or intensity of sound waves captured by the respective microphones as a function of time. In particular, the audio datasets may be given by respective time series of the respective amplitude or intensity.

Each of the spectrograms is obtained from one of the audio datasets. The spectrogram represents the frequency spectrum of the respective audio dataset as a function of time. It is therefore a two-dimensional array, wherein different lines of the array correspond to different frequencies and different columns of the array correspond to different time instances or vice versa. The values of the array are the corresponding amplitudes in the frequency domain. In particular, the spectrogram is generated by applying a short-time Fourier transform, STFT, to the time series of the respective audio dataset or to a pre-processed version of the time series of the respective audio dataset. The pre-processing may for example include noise filtering. The result of the STFT may in some implementations also be post-processed to generate the spectrogram. The post-processing may for example include scaling operations, for example to convert the frequencies into the Mel scale. The spectrograms are then Mel spectrograms accordingly.

The interaural level difference, ILD, map, can also be understood as a time and frequency dependent array as explained for the spectrograms and may, in particular, have the same size as the spectrograms. The values of the array are the corresponding values of the ILD that is the ratio of energy or intensity of a corresponding sound wave between the two microphones. A value of the ILD map may for example be computed as the decibel gain between the corresponding values of the spectrograms.

The interaural time difference, ITD, map, can also be understood as a time and frequency dependent array as explained for the spectrograms and may, in particular, have the same size as the spectrograms. The values of the array are the corresponding values of the ITD that is the difference in arrival time of a corresponding sound wave between the two microphones. Analogously, the interaural phase difference, IPD, map, can be understood as a time and frequency dependent array as explained for the spectrograms and may, in particular, have the same size as the spectrograms. The values of the array are the corresponding values of the IPD that is the phase difference of a corresponding sound wave between the two microphones. A value of the IPD map may for example be computed as the ratio of the corresponding value of one of the spectrograms and the corresponding conjugate value of the other spectrogram.

Due to the 2D format of the spectrograms as well as the at least one interaural difference map, they can be processed by means of the perception algorithm in a similar manner as the at least one camera image, for example by applying convolutional layers and so forth for feature extraction, regression, classification et cetera.

Preferably, the at least one interaural difference map comprises the ILD map and the IPD map or consists of the ILD map and the IPD map.

The at least one interaural difference map inherently contains information about the direction and distance of the audio sources in the environment of the vehicle. Therefore, the invention exploits this inherent information by using the CRNN to localize the audio sources. The audio source localization data generated in this way then guides the training of the at least one further ANN, which is designed to determine the actual bounding boxes, and the CRNN itself, for example in an end-to-end fashion. From another point of view, the audio source localization data may be used as an inherent ground truth for training the at least one further ANN, in particular for object detection.

Consequently, a particularly effective and efficient training of the at least one further ANN is achieved as well as an increased reliability of the at least one further ANN after the training. In particular, since input data from the visual domain, namely the camera images, as well as input data from the audio domain, namely the audio datasets, are utilized, a high detection performance is achieved for all lighting conditions.

In particular, when the training is completed, the CRNN is not necessarily required anymore for predicting the at least one bounding box. The CRNN can, however, still be used for audio source localization after the training.

The network parameters include, in particular, weights and/or bias factors of the CRNN and weights and/or bias factors of the at least one further ANN, in particular each of the at least one further ANN. To adapt the network parameters, in particular at least one predefined loss function depending on the output data and depending on the audio source localization data is evaluated and the network parameters are adapted based on a result of the evaluation.

The accuracy of the audio source localization may be further increased by using three or more microphones mounted at different positions on the vehicle. A respective time-dependent audio dataset is received from each microphone and a corresponding spectrogram is generated. The at least one interaural difference map is computed for each pair of microphones and the first input data contains the at least one interaural difference map computed for all pairs of microphones. The detection of the at least one bounding box may also be improved by including all spectrograms of all microphones to the second input data.

According to several implementations, for adapting the network parameters, a ground truth for the at least one bounding box is given by or depends on the audio source localization data.

A manual annotation of the audio datasets is therefore not required.

According to several implementations, at least one visual domain feature map is generated by applying a first object detection ANN of the at least one further ANN to the at least one camera image. At least one audio domain feature map is generated by applying an audio source localization ANN of the at least one further ANN to the spectrograms. The at least one visual domain feature map and the at least one audio domain feature map are fused, in particular by a fusion module of the perception algorithm, and the output data is predicted by applying a second object detection ANN of the at least one further ANN to the fused feature maps.

Consequently, the audio domain feature maps and the visual domain feature maps can be extracted by respective domain specific ANNs in an efficient manner before they are fused and the final step for the detection of the bounding boxes is performed by the domain agnostic second object detection ANN making use of both domains and therefore all available information to achieve a reliable detection.

The object detection ANNs may be designed according to object detection based on camera images. However, the first object detection ANN does not require a final softmax layer or the like to compute the final object classes based on the feature maps generated by the first object detection ANN. Instead, said feature maps may be directly output as the at least one visual domain feature map to the fusion module.

Adapting the network parameters of the at least one further ANN may include, in particular, adapting respective network parameters of the first object detection ANN, the second object detection ANN and the audio source localization ANN.

According to several implementations, fusing the at least one visual domain feature map and the at least one audio domain feature map comprises generating at least one difference map by subtracting the at least one visual domain feature map and the at least one audio domain feature map from each other, in particular channel-wise and feature by feature. At least one re-calibration vector is generated based on the at least one difference map. The at least one visual domain feature map multiplied with the at least one re-calibration vector to generate at least one re-calibrated visual domain feature map and the at least one audio domain feature map is multiplied with the at least one re-calibration vector to generate at least one re-calibrated audio domain feature map. The at least one re-calibrated video domain feature map and the at least one re-calibrated audio domain feature map are then fused, in particular concatenated.

In this way, a domain agnostic set of fused feature maps is obtained and then used for predicting the bounding boxes.

According to several implementations, generating the at least one re-calibration vector comprises applying sum pooling followed by a normalization followed by global average pooling followed by an activation function, in particular a tanh activation function, to the at least one difference map.

According to several implementations, the first object detection ANN is designed for object detection according to a predefined set of object classes, wherein the set of object classes contains a class for activated emergency vehicle lights.

Considering activated emergency vehicle lights in the object detection reduces false positive detection of emergency vehicles. Furthermore, the detection performance at low light conditions is particularly high for activated emergency vehicle lights.

According to several implementations, for each audio dataset a corresponding two-dimensional single magnitude map as a function of time and audio amplitude is generated, and the first input data comprises the single magnitude maps.

The single magnitude map can be considered as a binary map representing the audio amplitude of the sound waves underlying the respective audio dataset in 2D. Plotting the audio amplitude as a function of time and discretizing the temporal axis as well as the amplitude axis, each occupied bin may yield a value 1 in the resulting single magnitude map and each empty bin may yield a value 0. In this way, the audio amplitude as a function of time can also be processed as the spectrograms and the at least one interaural difference map. In this way, the accuracy of the audio source localization can be further increased.

According to a further aspect of the invention, a computer-implemented method for detecting at least one emergency vehicle in an environment of a vehicle is provided. Therein, a perception algorithm, which has been trained by using computer-implemented method for training a perception algorithm according to the invention, is provided, in particular stored to a memory device of the vehicle. Respective time-dependent audio datasets are received from two microphones, which are mounted at different positions on the vehicle, and a respective spectrogram is generated based on each audio dataset. At least one camera image is received from at least one camera mounted to the vehicle. Output data comprising at least one bounding box for the at least one emergency vehicle is predicted by applying the at least one further ANN to further or second input data containing the at least one camera image and the spectrograms.

The vehicle referred to with regard to the computer-implemented method for detecting the at least one emergency vehicle may be the same vehicle as referred to with regard to the computer-implemented method for training the perception algorithm. However, the vehicles may also be different from each other.

Unless stated otherwise, all steps of the computer-implemented method for detecting at least one emergency vehicle may be performed by a data processing apparatus, in particular of the vehicle, which comprises at least one computing unit. In particular, the at least one computing unit is configured or adapted to perform the steps of the computer-implemented method. For this purpose, the at least one computing unit may for example store a computer program comprising instructions which, when executed by the at least one computing unit, cause the at least one computing unit to execute the computer-implemented method.

For any implementation of the computer-implemented method for detecting at least one emergency vehicle, corresponding implementations of a method, which is not purely computer-implemented, are obtained by including method steps of generating the at least one camera image by the at least one camera and/or generating the audio datasets by the microphones.

In some implementations, the computer-implemented method for detecting the at least one emergency vehicle comprises training the perception algorithm by using a computer-implemented method for training a perception algorithm according to the invention.

According to a further aspect of the invention, a method for guiding a vehicle at least in part automatically is provided. Therein, a computer-implemented method for detecting at least one emergency vehicle according to the invention is carried out, in particular by at least one computing unit of the vehicle. Control signals for guiding the vehicle least in part automatically are generated, in particular by the by at least one computing unit, depending on the output data, for example depending on the at least one bounding box.

The control signals may for example be provided to one of more actuators of the vehicle, which may affect a longitudinal and/or lateral control of the vehicle depending on the control signals.

For use cases or use situations which may arise in the method and which are not explicitly described here, it may be provided that, in accordance with the method, an error message and/or a prompt for user feedback is output and/or a default setting and/or a predetermined initial state is set.

According to a further aspect of the invention, a data processing apparatus is provided, which comprises at least one computing unit, which is adapted to carry out a computer-implemented method for training a perception algorithm according to the invention and/or a computer-implemented method for detecting at least one emergency vehicle according to the invention.

According to a further aspect of the invention, a perception system for a vehicle is provided. The perception system comprises a memory device, which stores a perception algorithm, which is trained by using a computer-implemented method according to the invention. The perception system comprises two microphones for being mounted at different position on the vehicle, at least one camera for being mounted to the vehicle, which is configured to generate at least one camera image depicting an environment of the vehicle, and at least one computing unit. The at least one computing unit is configured to receive respective time-dependent audio datasets from the two microphones and generate a respective spectrogram based on each audio dataset, and to predict output data comprising at least one bounding box for at least one emergency vehicle in the environment of the vehicle by applying the at least one further ANN of the trained perception algorithm to further or second input data containing the at least one camera image and the spectrograms.

According to several implementations of the perception system, the two microphones are implemented as respective uni-directional microphones.

According to a further aspect of the invention, an electronic vehicle guidance system is provided, which comprises a perception system according to the invention and is configured to carry out a method according to the invention for guiding the vehicle at least in part automatically.

An electronic vehicle guidance system may be understood as an electronic system, configured to guide a vehicle in a fully automated or a fully autonomous manner and, in particular, without a manual intervention or control by a driver or user of the vehicle being necessary. The vehicle carries out all required functions, such as steering maneuvers, deceleration maneuvers and/or acceleration maneuvers as well as monitoring and recording the road traffic and corresponding reactions automatically. In particular, the electronic vehicle guidance system may implement a fully automatic or fully autonomous driving mode according to level 5 of the SAE J3016 classification. An electronic vehicle guidance system may also be implemented as an advanced driver assistance system, ADAS, assisting a driver for partially automatic or partially autonomous driving. In particular, the electronic vehicle guidance system may implement a partly automatic or partly autonomous driving mode according to levels 1 to 4 of the SAE J3016 classification. Here and in the following, SAE J3016 refers to the respective standard dated April 2021.

Guiding the vehicle at least in part automatically may therefore comprise guiding the vehicle according to a fully automatic or fully autonomous driving mode according to level 5 of the SAE J3016 classification. Guiding the vehicle at least in part automatically may also comprise guiding the vehicle according to a partly automatic or partly autonomous driving mode according to levels 1 to 4 of the SAE J3016 classification.

A computing unit may in particular be understood as a data processing device, which comprises processing circuitry. The computing unit can therefore in particular process data to perform computing operations. This may also include operations to perform indexed accesses to a data structure, for example a look-up table, LUT.

In particular, the computing unit may include one or more computers, one or more microcontrollers, and/or one or more integrated circuits, for example, one or more application-specific integrated circuits, ASIC, one or more field-programmable gate arrays, FPGA, and/or one or more systems on a chip, SoC. The computing unit may also include one or more processors, for example one or more microprocessors, one or more central processing units, CPU, one or more graphics processing units, GPU, and/or one or more signal processors, in particular one or more digital signal processors, DSP. The computing unit may also include a physical or a virtual cluster of computers or other of said units.

In various embodiments, the computing unit includes one or more hardware and/or software interfaces and/or one or more memory units.

A memory unit may be implemented as a volatile data memory, for example a dynamic random access memory, DRAM, or a static random access memory, SRAM, or as a non-volatile data memory, for example a read-only memory, ROM, a programmable read-only memory, PROM, an erasable programmable read-only memory, EPROM, an electrically erasable programmable read-only memory, EEPROM, a flash memory or flash EEPROM, a ferroelectric random access memory, FRAM, a magnetoresistive random access memory, MRAM, or a phase-change random access memory, PCRAM.

According to a further aspect of the invention, a vehicle, in particular a motor vehicle, is provided, which comprises a perception system according to the invention.

According to several implementations of the vehicle, a first microphone of the two microphones is mounted in a front half of the vehicle and a second microphone of the two microphones is mounted in a rear half of the vehicle.

According to several implementations of the vehicle, the microphones are implemented as uni-directional microphones and a respective direction of maximum sensitivity of the two microphones is parallel to a longitudinal axis of the vehicle.

According to a further aspect of the invention, a first computer program comprising first instructions is provided. When the first instructions are executed by a data processing apparatus, the first instructions cause the data processing apparatus to carry out a computer-implemented method for training a perception algorithm and/or a computer-implemented method for detecting at least one emergency vehicle according to the invention.

According to a further aspect of the invention, a second computer program comprising second instructions is provided. When the second instructions are executed by a perception system according to the invention, in particular by the at least one computing unit of the perception system, the second instructions cause the perception system to carry out a computer-implemented method for detecting at least one emergency vehicle according to the invention.

According to a further aspect of the invention, a computer-readable storage medium is provided, which stores a first computer program according to the invention and/or a second computer program according to the invention.

The first computer program, the second computer program and the computer-readable storage medium may be denoted as respective computer program products comprising the first and/or second instructions.

The first and/or second instructions may be provided as program code, for example. The program code can for example be provided as binary code or assembler and/or as source code of a programming language, for example C, and/or as program script, for example Python.

Further features of the invention are apparent from the claims, the figures and the figure description. The features and combinations of features mentioned above in the description as well as the features and combinations of features mentioned below in the description of figures and/or shown in the figures may be comprised by the invention not only in the respective combination stated, but also in other combinations. In particular, embodiments and combinations of features, which do not have all the features of an originally formulated claim, may also be comprised by the invention. Moreover, embodiments and combinations of features which go beyond or deviate from the combinations of features set forth in the recitations of the claims may be comprised by the invention.

In the following, the invention will be explained in detail with reference to specific exemplary implementations and respective schematic drawings. In the drawings, identical or functionally identical elements may be denoted by the same reference signs. The description of identical or functionally identical elements is not necessarily repeated with respect to different figures.

FIG. 1 shows schematically an exemplary implementation of a vehicle 1 according to the invention, which comprises an exemplary implementation of a perception system 2 according to the invention.

The perception system 2 comprises at least one computing unit, which is represented by a single computing unit 5 in FIG. 1. The perception system 2, in particular the computing unit 5, comprises a memory device (not shown) storing a perception algorithm 7 (see FIG. 3), which is trained by using a computer-implemented method according to the invention. The perception algorithm 7 contains a CRNN 12 and at least one further ANN 13, 14, 15, 18, 19, 26, and is trained to detect at least one emergency vehicle in the environment of the vehicle 1. It is noted that, while the CRNN 12 is required during training, it is optional once the training is completed.

The perception system 2 comprises two microphones 3a, 3b mounted at different position on the vehicle 1 and configured to generate respective time-dependent audio datasets 8 (see FIG. 3) based on sound reaching the microphones 3a, 3b from an environment of the vehicle 1. The perception system 2 comprises at least one camera 4 mounted to the vehicle 1 and configured to generate at least one camera image 9 (see FIG. 3) depicting the environment of the vehicle 1.

The computing unit 5 is configured to receive the audio datasets 8 from the two microphones 3a, 3b and to generate a respective spectrogram 17 (see FIG. 3) based on each audio dataset 8, in particular by applying a STFT to the respective audio dataset 8.

The computing unit 5 is configured to predict output data comprising at least one bounding box 27 for the at least one emergency vehicle by applying the at least one further ANN 13, 14, 15, 18, 19, 26 to input data containing the at least one camera image 9 and the spectrograms 17. Optionally, a target classifier module 29 of the perception algorithm 7 may identify the one or more emergency vehicle as targets to be tracked and a long short-term memory, LSTM, 30 of the perception algorithm 7 may be used to track them.

For example, the computing unit 5 may generate control signals for affecting a longitudinal and/or lateral control of the vehicle 1 depending on the bounding boxes 27 and/or depending on the tracked one or more emergency vehicle. Alternatively or in addition, a driver of the vehicle 1 may be informed or warned depending on the bounding boxes 27 and/or depending on the tracked one or more emergency vehicle.

For training a perception algorithm 7, the same vehicle 1 or another vehicle (not shown) equipped accordingly may be used. In the following, it is assumed that the same vehicle 1 is used during training. For the training, respective time-dependent audio datasets 8 are received from the two microphones 3a, 3b and optionally filtered by a noise filtering module 10 and a respective spectrogram 17 is generated based on each audio dataset 8. At least one interaural difference map, which contains an IPD map and/or an ITD map and/or an ILD map, is generated based on the spectrograms 17, in particular by an audio feature extraction module 11. Audio source localization data is generated, which for each grid cell 36, 37, 38 of a predefined spatial grid 35, as shown schematically in FIG. 5 and FIG. 6, in the environment of the vehicle 1 specifies a number of audio sources in the respective grid cell 36, 37, 38, by applying the CRNN 12 to first input data containing the spectrograms 17 and the at least one interaural difference map, and for example a respective single magnitude map (not shown) representing the audio amplitudes of each audio dataset 8.

At least one camera image 9 is received from the at least one camera 4 and output data comprising at least one bounding box 27 for the at least one emergency vehicle and for example corresponding score maps 28 is predicted by applying the at least one further ANN 13, 14, 15, 18, 19, 26 to second input data containing the at least one camera image 9 and the spectrograms 17.

In particular, at least one visual domain feature map 16 is generated by applying a first object detection ANN 13, 14 to the at least one camera image 9 and at least one audio domain feature map 20 is generated by applying an audio source localization ANN 18, 19 to the spectrograms 17. The at least one visual domain feature map 16 and the at least one audio domain feature map 20 are fused by a fusion module 21 of the perception algorithm 7. The output data is predicted by applying a second object detection ANN 26 to the fused feature maps. Network parameters of the CRNN 12 and the at least one further ANN 13, 14, 15, 18, 19, 26 are adapted depending on the output data and depending on the audio source localization data. In particular, the audio source localization data are used to provide a ground truth. These steps are repeated until a predefined termination condition is fulfilled, which defines that the training is considered to be completed.

The trained perception algorithm 7 provides a multi modal solution for detecting emergency vehicles in daytime and at night, in particular by detecting activated emergency vehicle lights in the visual domain and siren sound from emergency vehicles in the audio domain.

Figure 3:
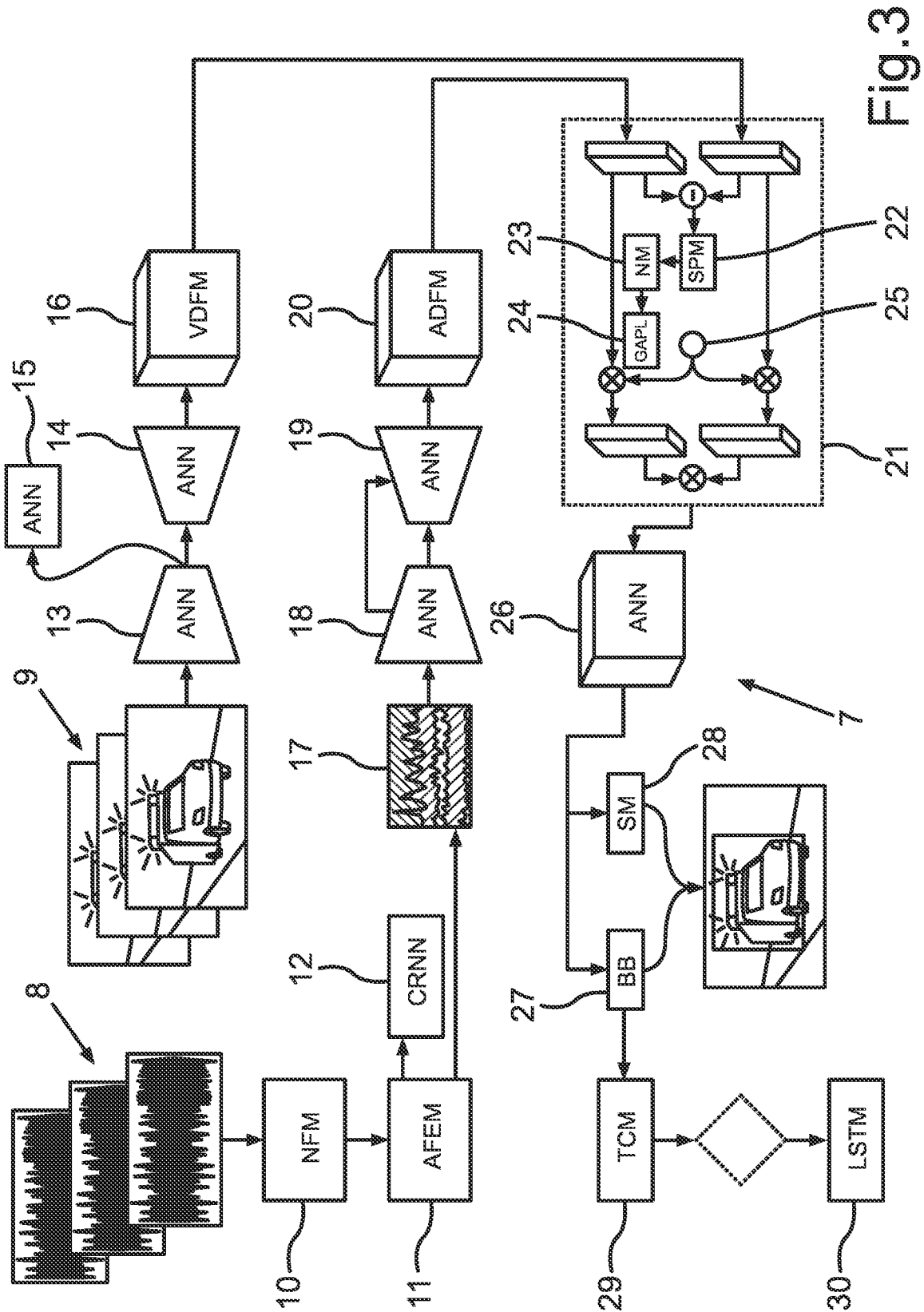
FIG. 3 illustrates a schematic block diagram of an exemplary implementation of a computer-implemented method for training a perception algorithm according to the invention.

FIG. 3 shows an end-to-end network architecture for training the perception algorithm 7. In the visual domain, frames from the one or more cameras 4 are learnt in feature space where object specific instance level attention may be applied. On the other hand, in the audio domain, the audio signals are converted to spectrograms 17, in particular Mel spectrograms, to learn the discriminative features in feature space. Later, features from the image data, namely the visual domain feature maps 16, and from the spectrograms 17, namely the audio domain feature map 20 features, are fused progressively to accurately identify the source of the audio signals from a detected bounding box of a vehicle. The final output may then be tracked over time using the LSTM 30.

Generally, the first object detection ANN 13, 14 may comprise an encoder module 13, which comprises a series of convolution layers for deep feature extraction. The deeper the encoder, the more detailed are the features. Standard encoder families such as ResNet, VGG, Inception et cetera can be employed for this task. The first object detection ANN 13, 14 further comprises a detection decoder module 14, which can detect activated emergency vehicle lights. In some implementations, two separate decoder modules 14, 15 are integrated in the setup. The classification decoder module 15 may be a binary classifier that classifies if an input frame contains an emergency vehicle or not. The main motivation to add this classification decoder module 15 is to guide the detection decoder module 14 to perform object detection more efficiently especially for flashlights or blinking lights. In case the detection decoder module 14 fails to detect activated emergency vehicle lights light but the classification decoder module 15 is certain about the presence of activated emergency vehicle lights in the frame, then the overall loss will be higher and thus the classification decoder module 15 may be considered as an auxiliary decoder module for the detection decoder module 14. For example, a standard binary cross-entropy loss or log loss may be used for the classification decoder module 15. Standard detection decoders such as Yolo, Mask R-CNN, SSD et cetera may be used as the detection decoder module 14.

In particular, the detection decoder module 14 may be generic and be able to detect many types of objects from predefined classes, wherein activated emergency vehicle lights are one of them. One challenge to detect activated emergency vehicle lights efficiently even while using a deep network is that the semantic occupancy of the concerned activated emergency vehicle lights may be low on in the image space in comparison with other classes such as vehicles, pedestrians, cyclists et cetera. Hence, instance level attention specific to activated emergency vehicle lights may be applied by multiplying a scalar with the corresponding neurons projected back to feature space. The set of scalar values may be obtained by applying global average pooling, GAP, on the output of the detection decoder module 14 and multiply with the resulting ID vector. This helps to further energize the neurons that correspond to the activated emergency vehicle lights.

The audio source localization ANN 18, 19 may also comprise a respective encoder module 18 and a decoder module 19.

The second object detection ANN 26 may for example be based on the EAST detector design for efficient text detection. The previous layers may be progressively up-sampled, for example by 2, and the number of channels may be reduced, for example from 256 to 32, before feeding the fused feature maps into the second object detection ANN 26. Then it is passed through four layers that produce four channels of feature maps. The final layer performs a regression of the score maps 28 and rotated bounding boxes 27. The loss function is $$L = L_s + \lambda_g L_g,$$

wherein $L_s$ and $L_g$ correspond to the loss of the score maps 28 and the geometric loss of rotated bounding boxes 27, respectively, and $\lambda_g$ represents the weighting ratio between the two losses.

A bounding box may be represented by its top left and right bottom corners in the output coordinate grid. For every pixel, the output feature map may consist of a bounding box and a detection score. The class balanced cross-entropy loss may be used for the score map prediction as $$L_s = -\beta S^{GT} \log S^P - (1-\beta)(1-S^{GT})\log(1-S^P),$$

wherein $S^P$ denotes the prediction of the score map and $S^{GT}$ the ground truth. $\beta$ is a class balancing weight factor between positive and negative input samples.

The sizes of emergency vehicle lights may vary widely. Regression losses using L1 or L2 may give more importance to larger sized bounding boxes and a scale-invariant loss may be more suitable. Thus, for example the IoU loss may be used for the bounding box regression as $$L_g = -\log IoU(B^P, B^{GT}) = -\log \frac{|B^P \cap B^{GT}|}{|B^P \cup B^{GT}|},$$

wherein $B^P$ is the predicted bounding box and $B^{GT}$ represents the ground truth of the corresponding emergency vehicle lights.

Since detecting emergency vehicle lights has its challenges, another child network, which may be a deep network or a standard multi-layer perceptron, may be trained to classify the final bounding box from the detection branch. This in turn may help to do the tracking. Upon a positive detection of an emergency vehicle the respective bounding box is passed to the LSTM 30. LSTM networks are a type of recurrent neural network, RNN, capable of learning order dependence in sequence prediction problems. RNNs are different from traditional feed-forward neural networks. Instead of only feeding the input data it also takes the previous historical information to predict the next outcome in sequence. An LSTM is capable of learning long term dependencies. Here, the input of the previous frames may be used to correctly track the emergency vehicle lights in the scene.

Figure 4:
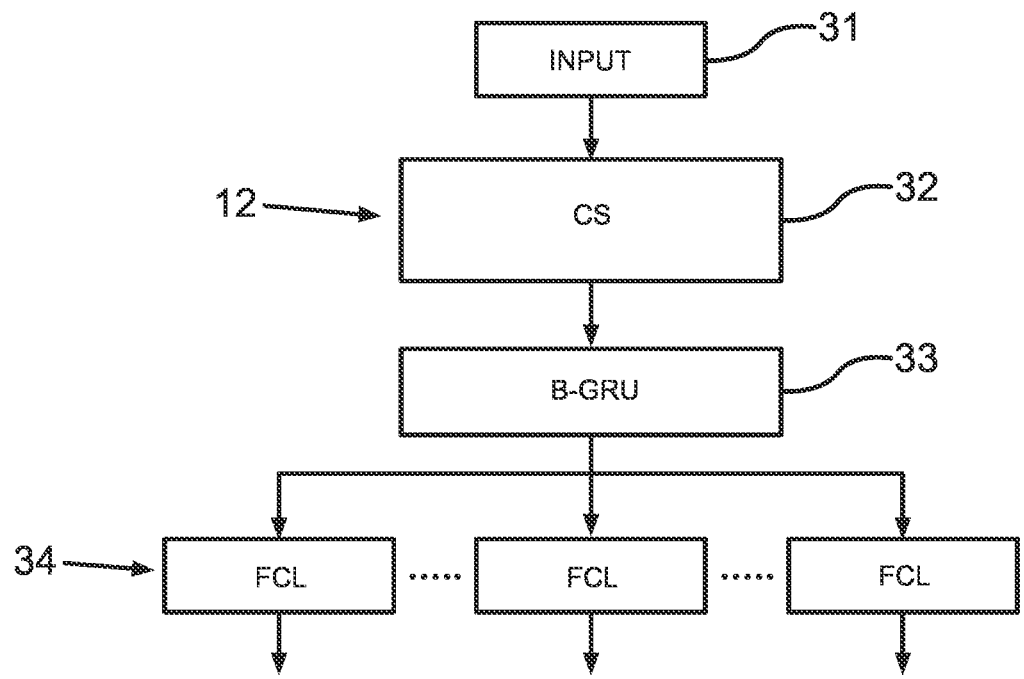
FIG. 4 illustrates a schematic block diagram of a CRNN of a perception algorithm trained according to a further exemplary implementation of a computer-implemented method for training a perception algorithm according to the invention.
Figure 5:
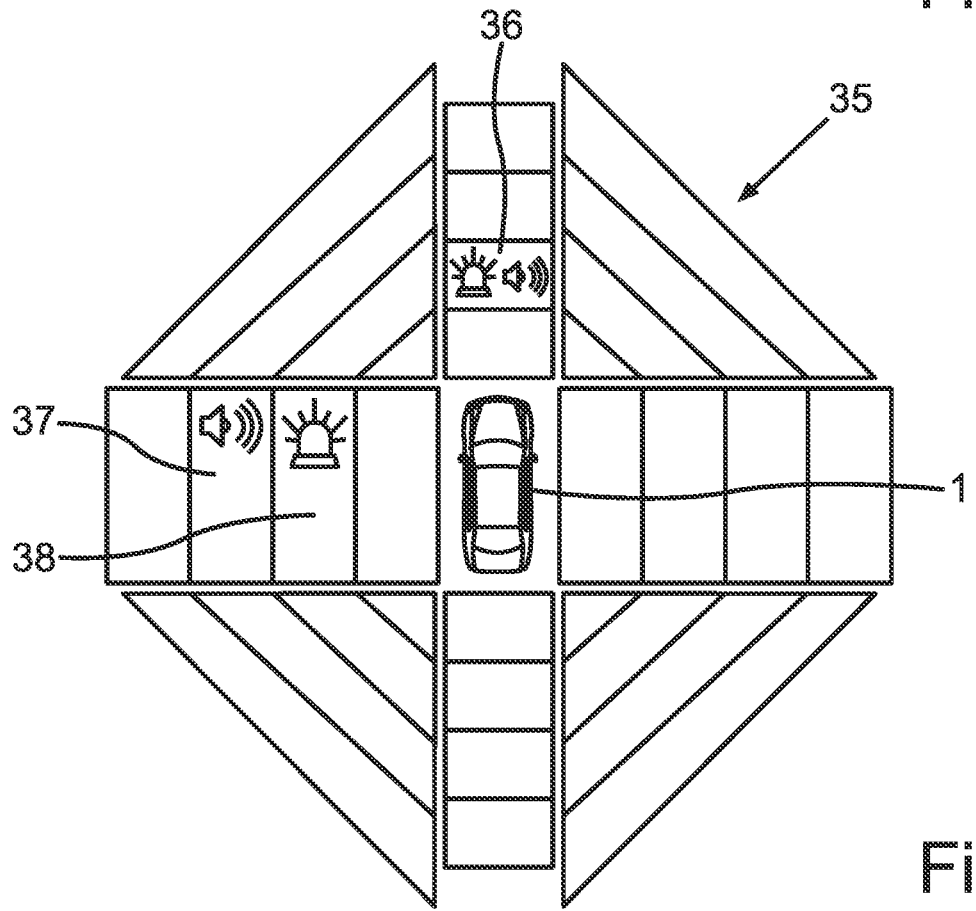
FIG. 5 illustrates schematically an example of a spatial grid for audio source localization according to a further exemplary implementation of a computer-implemented method for training a perception algorithm according to the invention.
Figure 6:
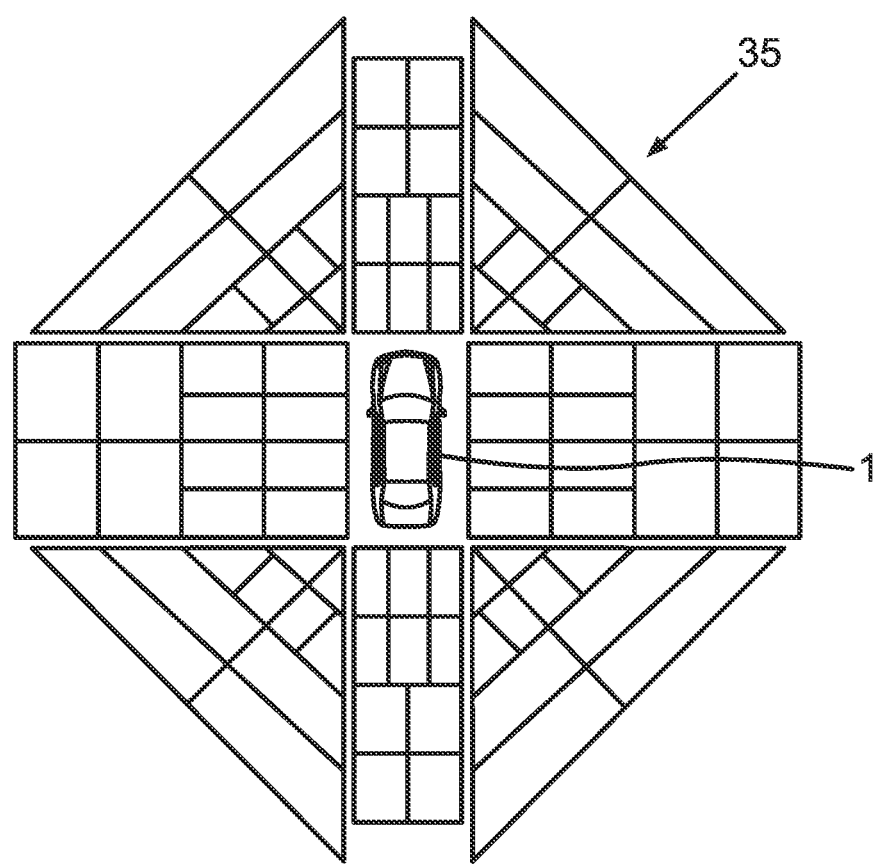
FIG. 6 illustrates schematically a further example of a spatial grid for audio source localization according to a further exemplary implementation of a computer-implemented method for training a perception algorithm according to the invention.

FIG. 4 shows schematically a possible architecture of the CRNN 12. The audio signals of the audio datasets 8 are processed to extract the relevant features which can then be used for modelling. The direction of an audio source can be detected by considering it to be a classification task and splitting the cartesian sphere into angular areas and a corresponding grid 35 as shown in FIG. 5. The grid 35 is not necessarily a regular grid and can be adjusted to the specific needs and the computational constraints, as depicted in FIG. 6, for example. CRNNs have proven to be a benchmark model for similar audio classification tasks. The CRNN 12 contains a convolution stage 32 with convolution layers each followed by a rectified linear unit, ReLu, layer a batch-normalization layer and a maximum pooling layer. Each convolution block is followed by a bi-directional gated recurrent unit, B-GRU, 33. The model is then trained on a set of four identified feature representations.

In particular, audio signals of the audio datasets 8 may be separately down-sampled and the respective spectrograms 17 may be obtained by using STFT with Hamming window of 40 ms length and 50% overlap. The spectrograms 17 are plotted and the ILD map is computed as the decibel gain between the spectrograms 17. To calculate the IPD map, the ratio between spectrogram values of one spectrogram 17 and the other spectrogram's 17 conjugate values is determined. Furthermore, a single magnitude map may be obtained to provide temporal information of the audio source. The input 31 to the CRNN 12 may then be a four-channel feature map, for example of dimensions 128×512.

To define the classes for the direction classification, one can consider a sphere and divide it into four equal hemispheres or eight unequal disjoint cones. Based on the type of division, one use an unequal-split-one-network approach or an equal-split-multiple-network approach. In the first case, a single deep neural network is trained to classify across eight different classes and in the latter case, four different models for the four equal hemispheres. Each model performs binary classification for two exactly opposite classes.

In the proposed architecture, Q refers to the number of branches of fully connected layers 34 to be used at the bottom of the architecture, G refers to the dimension of the fully connected layers 34, and C denotes the total number of neurons in the output layer followed by a sigmoid activation function. In the unequal-split-one-network approach, one has for example Q=1, G=128, C=8 and in the equal-split-multiple-network approach one has for example Q=1, G=64, C=2.

The audio signal from a single audio source may be processed and inherent features be extracted. The audio features are then fed to a trained model to accurately classify the direction of the single audio source. The sound from multiple audio sources may be filtered based on the required frequency and the relevant audio signal be extracted. The audio signal then undergoes feature extraction followed by a forward pass to the trained model. The output of the forward pass denotes the direction class. To separate multiple sources from different directions, cross correlation values for azimuth angle and elevation angle along the sine wave component can be constructed in ($\theta$, $\Psi$)-space and summed. A threshold can be set to separate the noise from the real audio signal. The required audio signal can then be fed to the pre-trained model to find out the direction of the audio source.

The fusion of the audio source with the respective image data obtained from the camera module may be made based on the direction of the classified audio sample as predicted by the CRNN model. This ensures that the sensor fusion is aware in terms of the direction of the vehicle surroundings.

The exemplary grid 35 of FIG. 5 has eight directional segments that can be denoted north, north-east, north-west, south, south-east, south-west, east and west. Each segment is subdivided into four regions depending on the distance from the vehicle 1, which results in 32 grid cells. It is assumed for example the CRNN 12 has identified that grid cell 36 contains an audio source of type emergency siren. In the same grid cell 36, also emergency vehicle lights are identified. Thus, the audio source can be mapped with the detected emergency vehicle lights. In another case, the CRNN 12 may find an audio source to be in grid cell 37 and the emergency vehicle lights are detected in grid cell 38. In order to handle this, during training time the distance between the audio source and emergency vehicle lights may be minimized to achieve tight coupling. This may be done with a regression-based loss function. In other words, it is penalized more if the audio source and emergency vehicle lights bounding box are in different grid cells. The audio based and image-based detection branches may have their separate ground truth labels, which will allow to calculate their individual losses and as well a mutual loss. In this way one achieves tight coupling of the audio source and the emergency vehicle lights. This solution can be equally effective at nighttime as it does not depend solely on a vehicle bounding box.

To convert the audio signals into spectrograms 17, as mentioned STFT may be used, for example with a window size and hop length of 1022 and 256, respectively. The audio source localization ANN 18, 19 may comprise seven stacked down-convolution and seven up-convolution layers with skip connections in between. For a mixed input audio spectrogram of 256×256, it outputs K spectrogram feature maps of the same size, where K represents the number of classes under consideration, for example 28. Given an audio mixture, the audio analysis network outputs spectrogram features in K different channels. The channels assigned to the source video categories may be selected and used as a spectrogram mask for the respective source. Each spectrogram mask is then applied to the mixture spectrogram in order to separate the corresponding sound source from the mixture.

The fusion module 21 may be designed to enable an effective combination of the unimodal features with the domain gap, mainly based on illumination. The fusion module 21 receives the visual domain feature maps 16 and the audio domain feature maps 20 and converts these modality-specific features to a modality invariant feature representation reducing the domain gap in feature space. To accomplish this, the features coming from different domains are subtracted fed to a sum pooling module 22 and used to guide the normalization module 23. Then it is fed into a GAP layer 24 and the tanh activation function is applied to obtain the modality agnostic feature representation. Finally, the original feature maps 16, 20 are re-calibrated by channel-wise multiplication of domain invariant features 25 obtained. This may be done iteratively in stages during the course of training, which helps to minimize the domain gap and generates domain invariant features for emergency vehicle lights.

Figure 2:
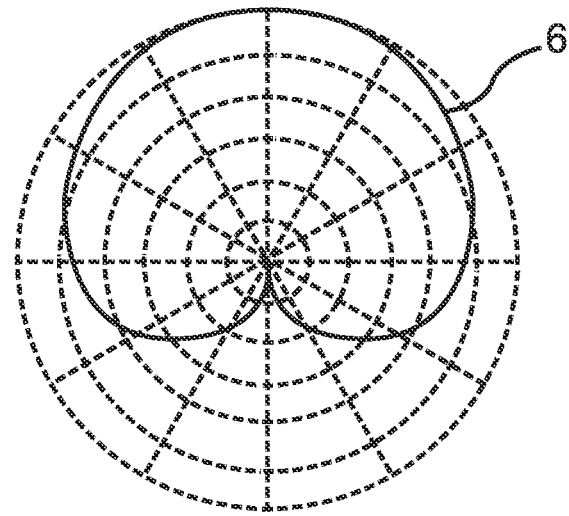
FIG. 2 illustrates schematically a polar pattern of a uni-directional microphone for use in an exemplary implementation of a perception system according to the invention.

The microphones 3a, 3b are preferably unidirectional microphones with a field range of approximately 180° each, which allows for reliably determining IPD and ILD, in particular. The unidirectional microphones pick up sound sources in a fairly wide range from the front of the microphone, may taper out sources not directly in front, and have almost no sensitivity to sounds coming directly from the rear of the microphone, as indicated by the polar pattern of a unidirectional microphone shown in FIG. 2. The polar pattern has approximately the shape of a Cardioid 6.

The nature of flashlights or blinking lights of emergency vehicles is unique. It is generally a high intensity light when turned on, creating a halo effect around the light. Hence, naturally the semantic features of this light become very strong in the night time due to high contrast. This leads to an impressive detection performance in the visible domain in a nighttime scenario. However, since the light dominates the scene, the detection performance of the vehicle itself is reduced at nighttime. Furthermore, since the contrast of the lights at nighttime is so high, the risk of false positives is increased as well. For example, the emergency vehicle lights may be confused with streetlights. At daylight conditions, however, the contrast of the emergency vehicle lights may become so poor that the detection performance becomes rather low.

According to the invention, these draw backs are overcome by mapping the activated emergency vehicle lights to the detected audio sources. In some implementations, the direction of the audio source may be identified by two strategically placed microphones using for example the phase angle difference between them. The information about the audio direction can then be passed to the CRNN, which is designed to perform grid level regression and localization of emergency vehicles. The audio source information along with the bounding box coordinates may then be tightly coupled together through a loss function, which can be used for optimization of the entire detection and tracking system.

FIG. 7 illustrates an example of a flowchart diagram of a computer-implemented method 70 for training a perception algorithm of a vehicle. In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In Block 71, provide a convolutional recurrent neural network (CRNN) and at least one further artificial neural network (ANN) to detect at least one emergency vehicle. In Block 72, receive at least two time-dependent audio datasets from two microphones mounted at different positions on the vehicle. In Block 73, generate at least two spectrograms based on the at least two time-dependent audio datasets. In Block 74, generate at least one interaural difference map based on the at least two spectrograms, which contains at least one of an interaural phase difference map or an interaural time difference map or an interaural level difference map. In Block 75, generate audio source localization data for at least one grid cell of a predefined spatial grid in an environment of the vehicle. In Block 76, specify a number of audio sources in the at least one grid cell. In Block 77, apply the CRNN to a first input data containing the at least two spectrograms and the at least one interaural difference map. In Block 78, receive at least one camera image from at least one camera mounted to the vehicle. In Block 79, predict output data of at least one bounding box for the at least one emergency vehicle by applying the at least one further ANN to a second input data containing the at least one camera image and the at least two spectrograms. In Block 80, adapt network parameters of the CRNN and the at least one further ANN by depending on the output data and the audio source localization data.

The methods, processes, or algorithms disclosed herein can be deliverable to or implemented by a processing device, controller, or computer, which can include any existing programmable electronic control unit or dedicated electronic control unit. Also, the methods, processes, or algorithms can be implemented in a software executable object. Furthermore, the methods, processes, or algorithms can be stored as data and instructions executable by a controller or computer in many forms including, but not limited to, information permanently stored on non-writable storage media, such as ROM devices, and information alterably stored on writeable storage media, such as floppy disks, magnetic tapes, CDs, RAM devices, and other magnetic and optical media. Computing devices described herein generally include computer-executable instructions, where the instructions can be executable by one or more computing or hardware devices, such as those listed above. Such instructions and other data can be stored and transmitted using a variety of computer-readable media. Computer-executable instructions can be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions (e.g., from a memory, a computer-readable medium, etc.) and executes these instructions, thereby performing one or more processes, including one or more of the processes described herein. Moreover, the methods, processes, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims of the invention. While the present disclosure is described with reference to the figures, it will be understood by those skilled in the art that various changes can be made and equivalents can be substituted without departing from the scope and spirit of the present disclosure. The words used in the specification are words of description rather than limitation, and it is further understood that various changes can be made without departing from the scope and spirit of the invention disclosure. In addition, various modifications can be applied to adapt the teachings of the present disclosure to particular situations, applications, and/or materials, without departing from the essential scope and spirit thereof. Additionally, the features of various embodiments can be combined to form further embodiments of the invention that cannot be explicitly described or illustrated. While various embodiments can have been described as providing advantages or being preferred over other embodiments or prior art implementations with respect to one or more desired characteristics, those of ordinary skill in the art recognize that one or more features or characteristics could be compromised to achieve desired overall system attributes, which depend on the specific application and implementation. These attributes can include, but not limited to, strength, cost, durability, life cycle cost, appearance, marketability, size, packaging, weight, serviceability, manufacturability, ease of assembly, etc. Therefore, to the extent any embodiments are described as less desirable than other embodiments or prior art implementations with respect to one or more characteristics, those embodiments are not outside the scope of the disclosure and can be desirable for particular applications. Thus, the present disclosure is thus not limited to the particular examples disclosed herein, but includes all embodiments falling within the scope of the appended claims.

The invention claimed is:

1. A computer-implemented method for training a perception algorithm of a vehicle, the computer-implemented method comprising:
    providing a convolutional recurrent neural network (CRNN) and at least one further artificial neural network (ANN) to detect at least one emergency vehicle;
    receiving at least two time-dependent audio datasets from two microphones mounted at different positions on the vehicle;
    generating at least two spectrograms based on the at least two time-dependent audio datasets;
    generating at least one interaural difference map based on the at least two spectrograms, which contains at least one of an interaural phase difference map or an interaural time difference map or an interaural level difference map;
    generating audio source localization data for at least one grid cell of a predefined spatial grid in an environment of the vehicle;
    specifying a number of audio sources in the at least one grid cell;
    applying the CRNN to a first input data containing the at least two spectrograms and the at least one interaural difference map;
    receiving at least one camera image from at least one camera mounted to the vehicle;
    predicting output data of at least one bounding box for the at least one emergency vehicle by applying the at least one further ANN to a second input data containing the at least one camera image and the at least two spectrograms; and adapting network parameters of the CRNN and the at least one further ANN by depending on the output data and the audio source localization data.

2. The computer-implemented method of claim 1, wherein adapting the network parameters further comprising:
providing a ground truth for the at least one bounding box given by or dependent upon the audio source localization data.

3. The computer-implemented method of claim 1, further comprising:
generating at least one visual domain feature map by applying a first object detection ANN of the at least one further ANN to the at least one camera image;
generating at least one audio domain feature map by applying an audio source localization ANN of the at least one further ANN to the at least two spectrograms;
fusing the at least one visual domain feature map and the at least one audio domain feature map; and
predicting the output data by applying a second object detection ANN of the at least one further ANN to the fused feature maps.

4. The computer-implemented method of claim 3, wherein fusing the at least one visual domain feature map and the at least one audio domain feature map further comprising:
generating at least one difference map by subtracting the at least one visual domain feature map and the at least one audio domain feature map from each other;
generating at least one re-calibration vector based on the at least one difference map;
multiplying the at least one visual domain feature map with the at least one re-calibration vector to generate at least one re-calibrated visual domain feature map;
multiplying the at least one audio domain feature map with the at least one re-calibration vector to generate at least one re-calibrated audio domain feature map; and
fusing the at least one re-calibrated video domain feature map and the at least one re-calibrated audio domain feature map.

5. The computer-implemented method of claim 4, wherein generating the at least one re-calibration vector further comprising:
applying sum pooling, followed by a normalization, followed by a global average pooling, followed by an activation function, to the at least one difference map.

6. The computer-implemented method of claim 3, wherein the first object detection ANN is designed for object detection according to a predefined set of object classes, wherein the set of object classes contains a class for activated emergency vehicle lights.

7. The computer-implemented method of claim 1, wherein each audio dataset of the at least two time-dependent audio datasets further comprising:
generating a corresponding two-dimensional single magnitude map as a function of time and audio amplitude, wherein the first input data comprises the single magnitude maps.

8. A perception system for a vehicle, the perception system comprising:
a data processing apparatus;
a memory device configured to store a perception algorithm;
a convolutional recurrent neural network (CRNN) and at least one further artificial neural network (ANN) configured to detect at least one emergency vehicle;
at least two microphones mounted at different positions on the vehicle configured to generate at least two time-dependent audio datasets;
at least one camera mounted to the vehicle configured to generate at least one camera image; and
a computing unit configured to:
generate at least two spectrograms based on the at least two time-dependent audio datasets;
generate at least one interaural difference map based on the at least two spectrograms, which contains at least one of an interaural phase difference map or an interaural time difference map or an interaural level difference map:
generate audio source localization data for at least one grid cell of a predefined spatial grid in an environment of the vehicle;
specify a number of audio sources in the at least one grid cell:
apply the CRNN to a first input data containing the at least two spectrograms and the at least one interaural difference map;
predict output data of at least one bounding box for the at least one emergency vehicle by applying the at least one further ANN to a second input data containing the at least one camera image and the at least two spectrograms; and
adapt network parameters of the CRNN and the at least one further ANN by depending on the output data and the audio source localization data.

9. The perception system of claim 8, wherein the at least one camera image depicts the environment of the vehicle, and
wherein the computing unit is configured to predict output data including at least one bounding box for at least one emergency vehicle in the environment of the vehicle by applying the at least one further ANN to the second input data containing the at least one camera image and the at least two spectrograms.

10. The perception system of claim 8, wherein the at least two microphones are implemented as respective uni-directional microphones.

11. The perception system of claim 8, wherein the at least two microphones includes a first microphone mounted in a front half of the vehicle and a second microphone is mounted in a rear half of the vehicle.

12. The perception system of claim 8, wherein the at least two microphones are configured to have a respective direction of maximum sensitivity parallel to a longitudinal axis of the vehicle.

13. The perception system of claim 8, wherein the data processing apparatus is configured to execute at least one instructions.

14. The perception system of claim 8, wherein adapt the network parameters further comprises:
provide a ground truth for the at least one bounding box given by or dependent upon the audio source localization data.

15. The perception system of claim 8, wherein the computing unit further comprises:
generate at least one visual domain feature map by applying a first object detection ANN of the at least one further ANN to the at least one camera image;
generate at least one audio domain feature map by applying an audio source localization ANN of the at least one further ANN to the at least two spectrograms;
fuse the at least one visual domain feature map and the at least one audio domain feature map; and predict the output data by applying a second object detection ANN of the at least one further ANN to the fused feature maps.

16. The perception system of claim 15, wherein fuse the at least one visual domain feature map and the at least one audio domain feature map further comprises:
   generate at least one difference map by subtracting the at least one visual domain feature map and the at least one audio domain feature map from each other;
   generate at least one re-calibration vector based on the at least one difference map;
   multiply the at least one visual domain feature map with the at least one re-calibration vector to generate at least one re-calibrated visual domain feature map;
   multiply the at least one audio domain feature map with the at least one re-calibration vector to generate at least one re-calibrated audio domain feature map; and
   fuse the at least one re-calibrated video domain feature map and the at least one re-calibrated audio domain feature map.

17. The perception system of claim 16, wherein generate the at least one re-calibration vector further comprises:
   apply sum pooling, followed by a normalization, followed by a global average pooling, followed by an activation function, to the at least one difference map.

18. The perception system of claim 15, wherein the first object detection ANN is designed for object detection according to a predefined set of object classes,
   wherein the set of object classes contains a class for activated emergency vehicle lights.

19. The perception system of claim 8, wherein each audio dataset of the at least two time-dependent audio datasets further comprises:
   generate a corresponding two-dimensional single magnitude map as a function of time and audio amplitude,
   wherein the first input data comprises the single magnitude maps.

20. A non-transitory computer-readable storage medium storing instructions, which when executed on a computer, cause the computer to perform a method for training a perception algorithm of a vehicle, the method comprising:
   providing a convolutional recurrent neural network (CRNN) and at least one further artificial neural network (ANN) to detect at least one emergency vehicle;
   receiving at least two time-dependent audio datasets from two microphones mounted at different positions on the vehicle;
   generating at least two spectrograms based on the at least two time-dependent audio datasets;
   generating at least one interaural difference map based on the at least two spectrograms, which contains at least one of an interaural phase difference map or an interaural time difference map or an interaural level difference map;
   generating audio source localization data for at least one grid cell of a predefined spatial grid in an environment of the vehicle;
   specifying a number of audio sources in the at least one grid cell;
   applying the CRNN to a first input data containing the at least two spectrograms and the at least one interaural difference map;
   receiving at least one camera image from at least one camera mounted to the vehicle;
   predicting output data of at least one bounding box for the at least one emergency vehicle by applying the at least one further ANN to a second input data containing the at least one camera image and the at least two spectrograms; and
   adapting network parameters of the CRNN and the at least one further ANN by depending on the output data and the audio source localization data.

* * * * *